May 2, 1950 H. R. GRAU 2,505,765
INTRAVENOUS INJECTION EQUIPMENT
Filed Jan. 23, 1946 7 Sheets-Sheet 1
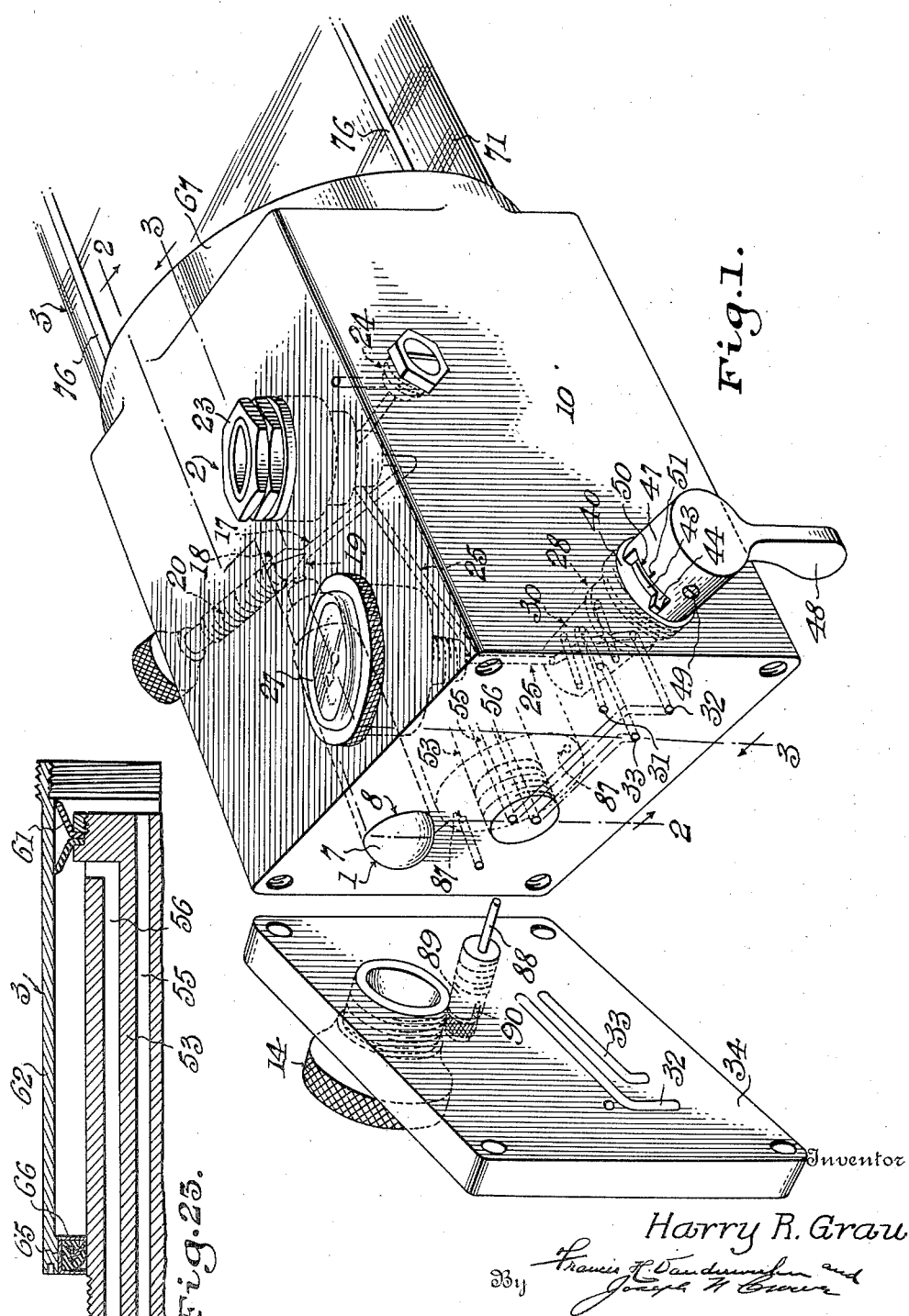
Inventor
Harry R. Grau
Attorneys May 2, 1950 H. R. GRAU 2,505,765
INTRAVENOUS INJECTION EQUIPMENT
Filed Jan. 23, 1946 7 Sheets-Sheet 2
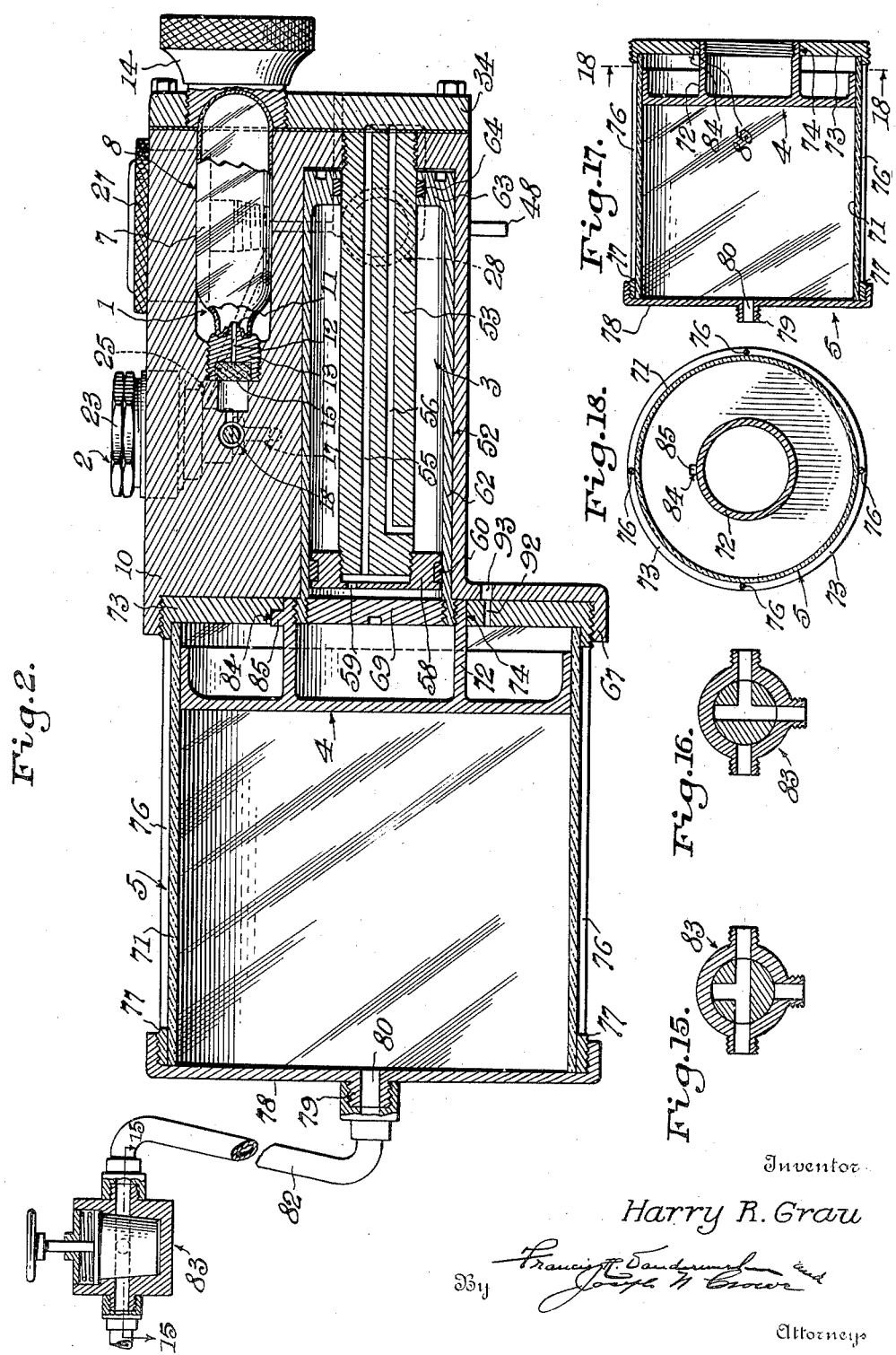
Inventor
Harry R. Grau
By
Attorneys May 2, 1950 H. R. GRAU 2,505,765
INTRAVENOUS INJECTION EQUIPMENT
Filed Jan. 23, 1946 7 Sheets-Sheet 3
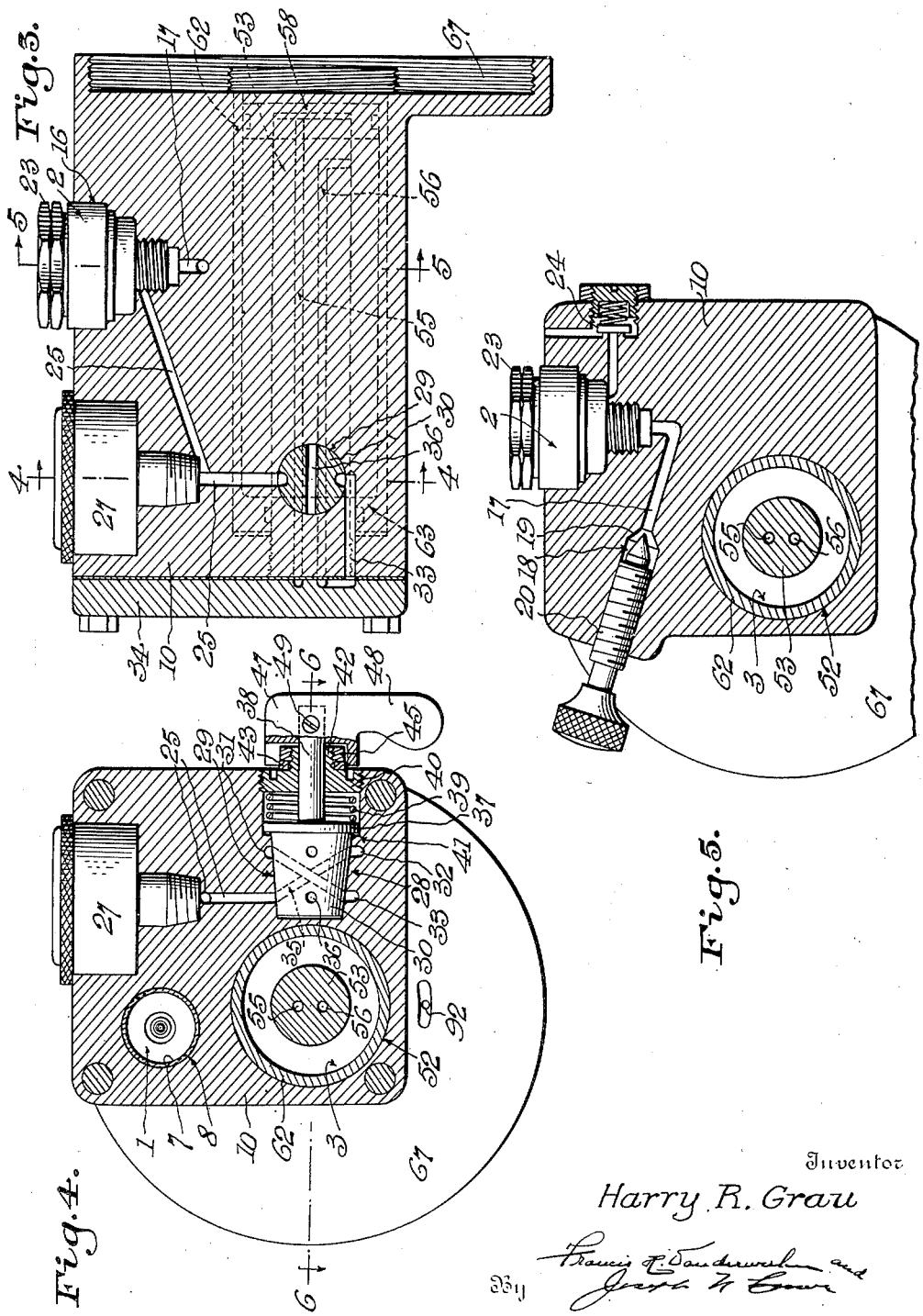
Inventor
Harry R. Grau
By
Attorneys May 2, 1950     H. R. GRAU     2,505,765
INTRAVENOUS INJECTION EQUIPMENT
Filed Jan. 23, 1946     7 Sheets-Sheet 4
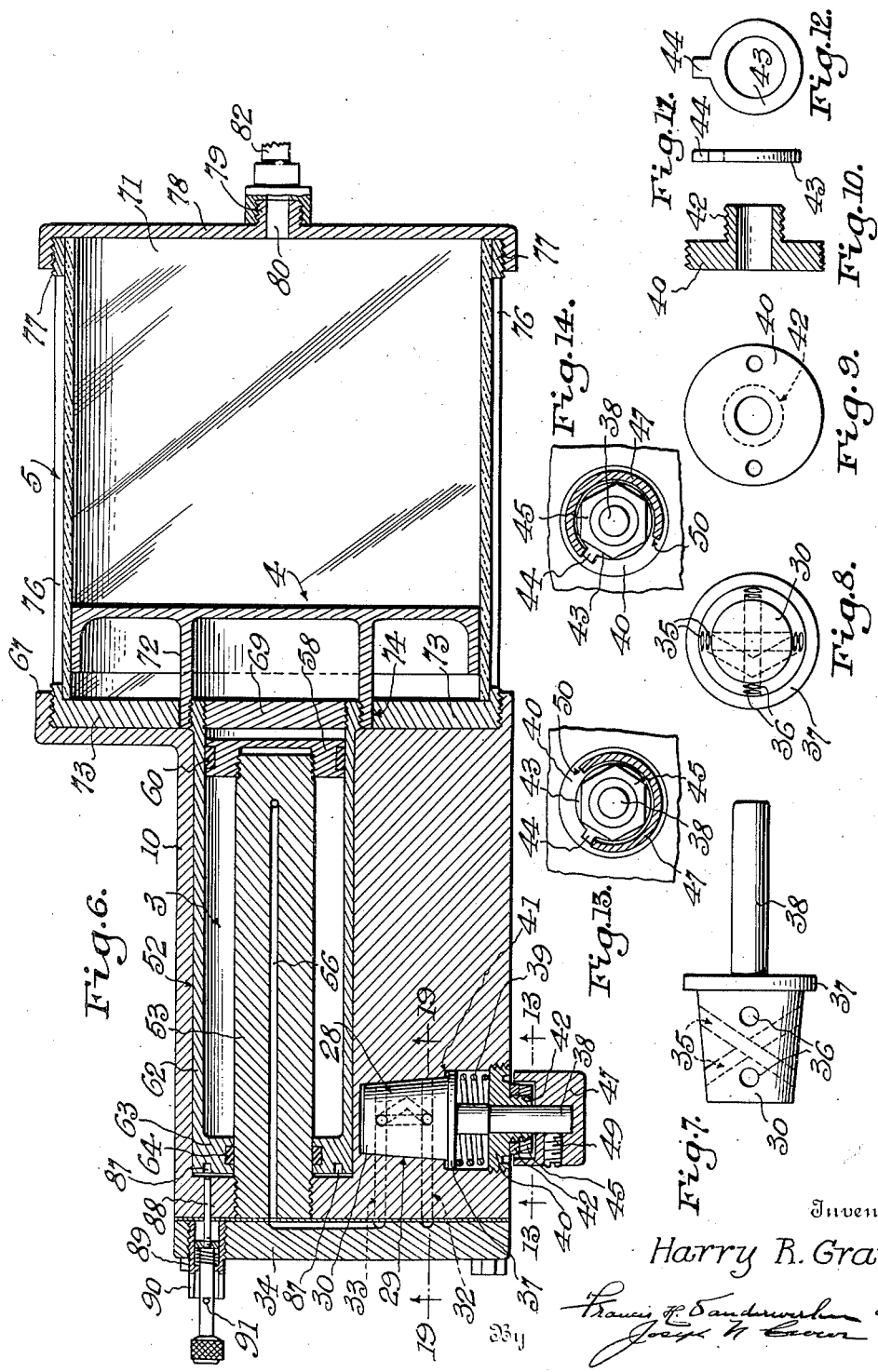
Inventor
Harry R. Grau

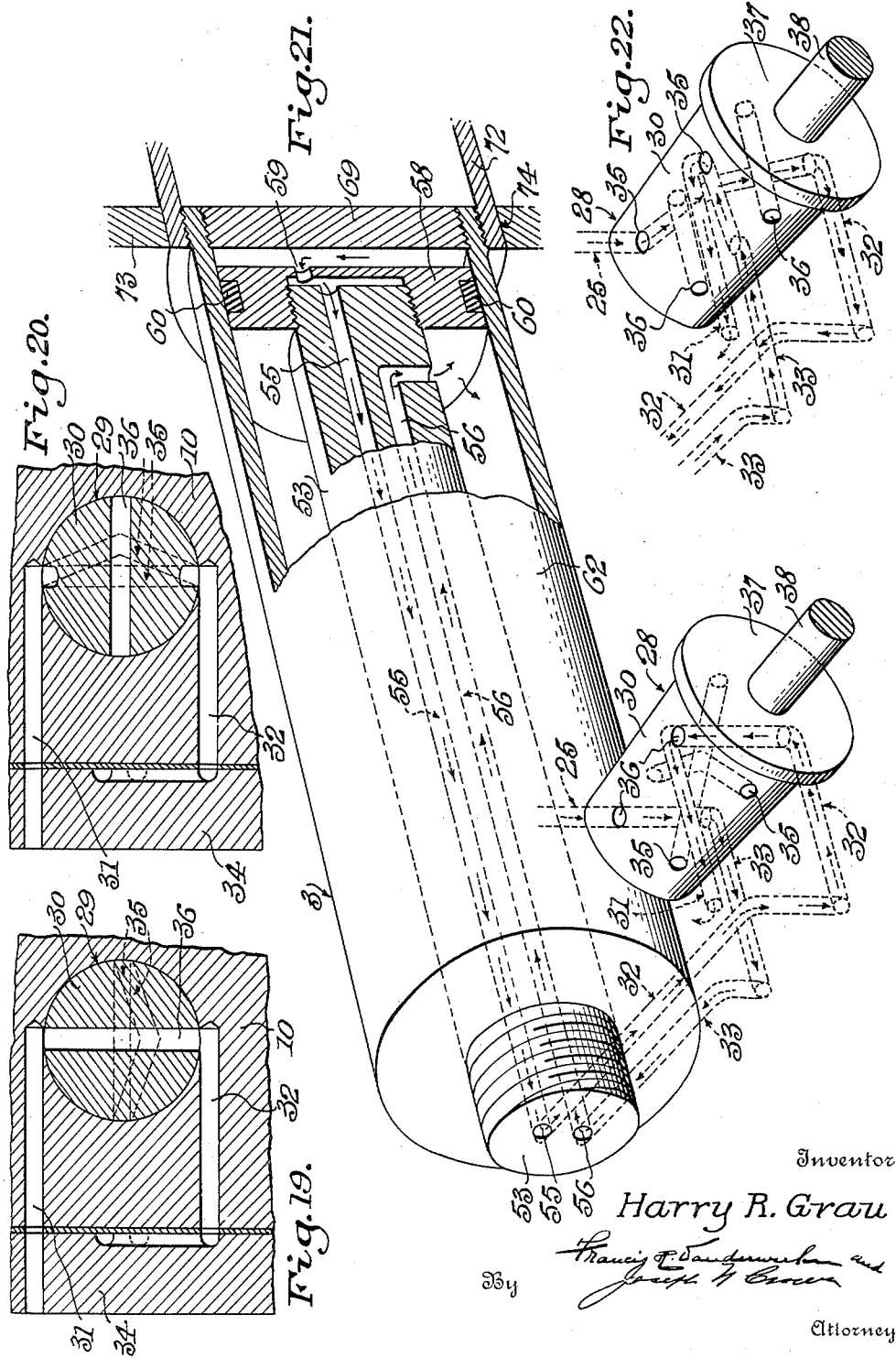

May 2, 1950          H. R. GRAU          2,505,765
INTRAVENOUS INJECTION EQUIPMENT
Filed Jan. 23, 1946          7 Sheets-Sheet 6
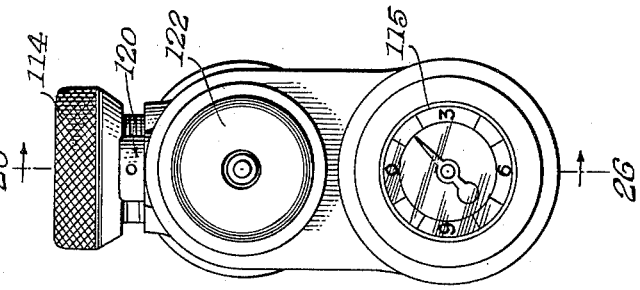
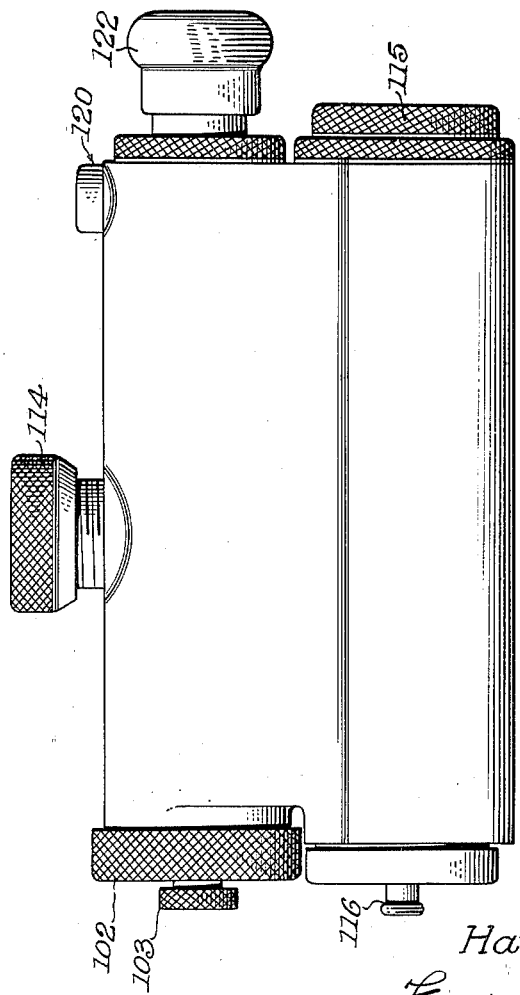
Inventor
Harry R. Grau
By
Attorneys May 2, 1950 H. R. GRAU 2,505,765
INTRAVENOUS INJECTION EQUIPMENT
Filed Jan. 23, 1946 7 Sheets-Sheet 7

Inventor
Harry R. Grau
By
Attorneys

Patented May 2, 1950

2,505,765

UNITED STATES PATENT OFFICE 2,505,765

INTRAVENOUS INJECTION EQUIPMENT

Harry Robert Grau, United States Army

Application January 23, 1946, Serial No. 642,952

18 Claims. (Cl. 128—214)

(Granted under the act of March 3, 1883, as amended April 30, 1928; 370 O. G. 757)

The invention described herein may be manufactured and used by or for the Government for governmental purposes, without payment to me of any royalty thereon.

This invention relates to intravenous injection equipment and it is particularly directed to a non-gravity or positive feed device for injecting a physiological solution intravenously.

The usual procedure for intravenous injections is to employ gravity feed devices. Several devices have been devised for this purpose, however, which are non-gravity or positive feed. For the most part these positive feed devices are actuated by hydraulic or pneumatic pressure positioned externally of the device and requiring a plurality of cylinders and pistons interconnected by linkage assemblies to inject physiological solutions under acceptable sterile conditions. These prior art devices are therefore limited in use due to the cumbersomeness and bulkiness of construction required to meet the conditions of sterility.

It is an object of this invention, therefore, to provide a positive feed injection device of the class described that will be sufficiently compact for utilization in all positions and under all conditions.

Another object of this invention is to provide a device of the class described that will automatically inject a physiological solution intravenously when strapped to an injured individual, litter or other suitable structure.

Still another object of this invention is to provide a device of the class described having a reciprocable, gas operated piston, detachably connected to a syringe plunger.

Still another object of this invention is the provision of a device of the class described which will administer a plurality of intravenous injections under sterile conditions.

A further object of the invention is to provide an automatic intravenous injection device having a rapidly and easily removable and interchangeable syringe which may be stocked empty for filling from a large supply source or stocked filled for immediate use.

A still further object of this invention is the provision of an automatic positive feed intravenous injection device containing a source of pressure and means for regulating the pressure to inject a physiological solution at a predetermined rate.

A still further object of this invention is to provide a device of the class described which will be compact, efficient and durable.

The foregoing and other objects and advantages of this invention will be more fully understood from reading the specification in conjunction with the drawings forming a part thereof, wherein:

Figure 1 is a perspective view showing the relationship of the pressure source and regulating means with the end plate detached for clarity;

Figure 2 is a detailed sectional view taken on the line 2—2 of Figure 1 with the end plate attached;

Figure 3 is a detailed sectional view taken on the line 3—3 of Figure 1 with the syringe bottle removed and the end plate attached;

Figure 4 is a detailed sectional view taken on the line 4—4 of Figure 3;

Figure 5 is a detailed sectional view taken on the line 5—5 of Figure 3;

Figure 6 is a detailed sectional view taken on the line 6—6 of Figure 4, with the syringe bottle attached;

Figure 7 is a plan view of the rotatable member of the pressure directing valve;

Figure 8 is an end view of the rotatable member of the pressure directing valve;

Figure 9 is an end view of the retainer plug for the pressure directing valve assembly;

Figure 10 is a vertical sectional view of the retainer plug for the pressure directing valve assembly;

Figure 11 is a side elevation of the pressure directing valve stop washer;

Figure 12 is a face view of the pressure directing valve stop washer;

Figure 13 is a sectional view taken on the line 13—13 of Figure 6;

Figure 14 is a sectional view similar to Figure 13 with the rotatable member of the pressure directing valve in another position;

Figure 15 is a sectional view of the stop-cock taken on the line 15—15 of Figure 2;

Figure 16 is a sectional view similar to Figure 15 with the stop-cock in another position;

Figure 17 is a detailed sectional view of the syringe bottle and plunger therein;

Figure 18 is a sectional view taken on the line 18—18 of Figure 17;

Figure 19 is a sectional view of the pressure directing valve and registering conduits taken on line 19—19 of Figure 6;

Figure 20 is a sectional view similar to Figure 19 with the pressure directing valve in another position;

Figure 21 is a diagrammatic perspective view showing the arrangement of the pressure directing valve and sleeve piston;

Figure 22 is a diagrammatic perspective of the pressure directing valve and registering conduits with the valve in another position;

Figure 23 is a detailed sectional view of a half of the sleeve piston assembly showing modified seal means;

Figure 24 is a side elevation of a modification of this invention;

Figure 25 is an end view of the modification of Figure 24; and

Figure 26:
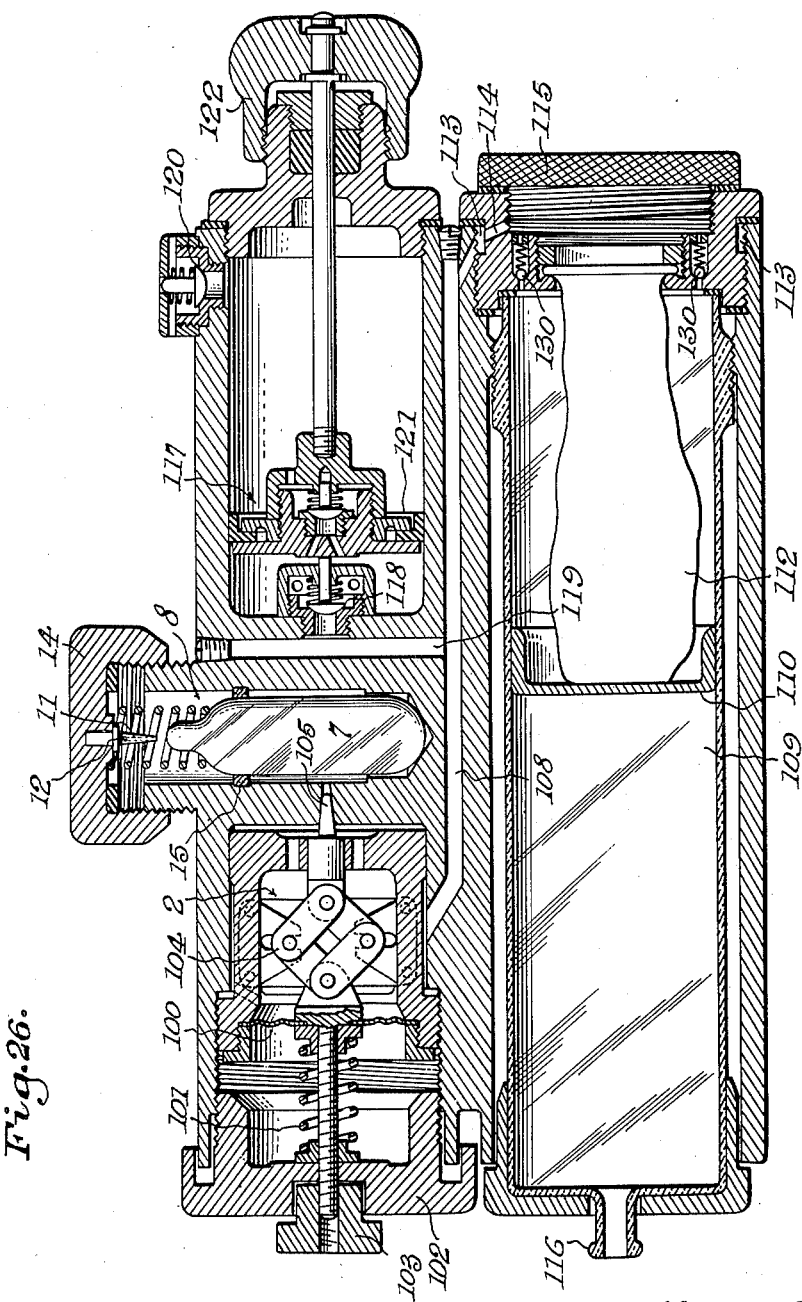
Figure 26 is a detailed sectional view taken on the line 26—26 of Figure 25.

Referring to the drawings where like members are given the same reference numeral throughout, the invention consists generally of a source of pressure 1 connected through pressure regulating means 2 with a sleeve piston 3 which actuates a plunger 4 contained in a syringe bottle 5.

In describing the preferred or specific form of the invention, the individual component parts described broadly above will first be described specifically hereinbelow; and, the cooperation of these component parts to produce the desired results will be described in conjunction with a description of a series of operations to clearly and fully describe the invention.

The source of pressure 1 comprises a carbon dioxide ampule 7 fitted into a well 8 formed in a housing 10. One end of the ampule 7 contacts a needle 11 having a conduit 12 formed therein. This needle 11 is contained in or formed as a part of a plug 13 threadedly secured to a housing 10. The otherwise open end of the well 8 is provided with screw plug or cap 14 which abuts against the end of the ampule 7 forcing it against the needle 11 which penetrates the ampule permitting the gas contained therein under pressure to pass through the needle conduit 12. A Carborundum disk 15 of known dimension and porosity to permit a known pressure (such as 35 pounds per square inch) to pass therethrough, is positioned in the plug 13 closing the conduit 12. A conduit or closed channel 17 connects this source of pressure with a variable pressure regulator 2.

Positioned in the channel 17 is a shut-off valve 18. This shut-off valve 18 comprises a seat 19 positioned in the conduit 17 and a rotatable plunger 20 threadedly engaging the housing wall to selectively open or close the conduit 17 by screwing the plunger 20 into or out of contact with the valve seat 19.

Suitable variable pressure regulating means 2 is operably connected or registered with the channel or closed conduit 17. A pressure regulator that has proved very satisfactory is a spring and diaphragm type fully described in the pending application of Jacobsen, Oldham, and Hoffman, bearing Serial No. 567,972. This pressure regulator 2 is preferably threadedly secured in a well 16 provided in the housing 10 and is provided with a variable control member in the form of a spring compressor threaded to the regulator housing and having a lock nut 23 associated therewith. A spring controlled pressure relief valve 24 is provided with the regulator 2 as a safety factor to avoid excessive pressure being built up in the regulator in case of failure thereof.

Connected to or registered with the outlet of said pressure regulator 2 through any suitable means (such as a closed conduit 25 or a channel formed in the housing) is a pressure gauge 27. This pressure gauge 27 is of commercial design and preferably of the type having connection to the inlet pressure side of the pressure regulator 2 to give a reading of the pressure available and a second connection with the regulated pressure outlet side of the pressure regulator to give a reading of the regulated pressure. For the purposes of illustration and clarity the pressure gauge is shown or illustrated as connected to the regulated pressure side of the pressure regulator 2 only. The regulated pressure conduit or closed channel 25 is continued past the pressure gauge 27 to connect or register with a pressure directing valve 28.

This directing valve 28 is illustrated as a well 29 formed in the housing 10 and having a rotatable member 30 therein. This well 29 may be in the form of a shroud or casing supported by the housing and function satisfactorily. The well 29 has a plurality of conduits connected therewith; as illustrated there are four such conduits. One of these conduits is an extension of the regulated pressure conduit 25; another conduit 31 vents to the atmosphere. The other two well conduits 32 and 33 lead to the sleeve piston 3 to impart movement in a desired direction, as will be discussed fully hereinafter. These conduits 32 and 33 are illustrated as having portions thereof formed in the housing back plate 34 and closed by the housing 10.

Fitted into the well 29, which is tapered slightly, is the rotatable member 30 having two pairs of conduits 35 and 36 provided therein. One set of conduits 35 are crossed and oblique to the axis of the rotatable member and connect the regulated pressure conduit 25 with conduit 32 while venting conduit 33 to the atmosphere through conduit 31. The other set of conduits 36 are parallel to each other and perpendicular to the axis of the rotatable member and positioned 90° from the open ends of the conduits 35. When rotated into operable position these conduits 36 connect the regulated pressure conduit 25 with conduit 33 while venting conduit 32 to the atmosphere through conduit 31.

The rotatable member 30 is provided with an annular shoulder 37 and stem 38. A coil spring 39, surrounding the stem 38 and compressed between the annular shoulder 37 and a retaining plug 40 threadedly engaging the well 29, urges the shoulder 37 against a shoulder 41 in the well 29 to positively position the rotatable member 30 therein. The stem 38 extends through and beyond the retaining plug 40 and is freely rotatable with respect thereto. Positioned on an axial projection 42 of the retaining plug 40 is a stop washer 43 having a radial projection 44 thereon, which washer 43 is held against rotation by a lock nut 45 threadedly engaging the axial projection 42 to clamp the washer between the nut 45 and retaining plug 40. A closure cup 47 having a handle 48 thereon is constructed and arranged in a manner to be fitted on the stem 38 and secured thereto in any suitable manner, such as by a set screw 49. A portion of the cup periphery is cut out, as at 50, to receive the projection 44 on the stop washer 43 and function as limit stops when rotating the rotatable member 30 thereby assuring proper alignment of the conduits 35 and 36 therein with the conduits 25, 31, 32 and 33 in the well 29. A marker 51 is provided to indicate a neutral position between the conduit alignments where pressure does not flow through the valve.

The reciprocable sleeve piston 3 is positioned in a cylindrical guideway or cylinder 52 provided in the housing 10. The cylinder 52 is open at one end to permit the sleeve piston 3 to be moved outwardly therefrom. Extending within the cylinder 52 and in axial alignment therewith, is a fixed piston or stem 53 threadedly secured to the housing 10. Extending within the stem 53 are two conduits or ports 55 and 56 registering with conduits 32 and 33, respectively. One of these conduits 56 terminates through the side of said stem 53, whereas the other conduit 55 extends throughout the length of the stem 53 terminating in the face thereof. Threadedly engaging the free end of the fixed piston 53 is a head member 58 constructed and arranged to permit a port 59 through the face thereof to be in communication with the conduit 55 extending through the face of the stem 53. Suitable sealing means are associated with the head member 58, such as an O ring 60 as illustrated in Figure 6, or the "Barlock 'Klozure'" 61 as illustrated in Figure 23.

The cylindrical sleeve piston 3, as illustrated in the drawings, comprises a cylindrical sleeve member 62 having the inner surface thereof in slidable sealing contact with the sealing means 60 or 61 of the fixed piston head member 58. The innermost end of the sleeve member 62 is provided with an annular projection 63 surrounding the stem 53 and having a sealing member 64 associated with the projection 63 in slidable sealing contact with the stem 53 to provide an expansible chamber between the projection 63 and stem head 58. Another suitable method of slidably sealing the innermost end of the sleeve 62 around the stem 53 is the use of leather cups 65 reinforced with steel plates 66 as illustrated in Figure 23. The other end of the sleeve 62 is sealed by a disc 69 threadedly engaging the inner surface of the sleeve 62 to provide an expansible chamber between the disc 69 and stem head 58. In assembling this part of the structure, the stem 53 is first inserted, the sleeve 62 positioned thereon, the stem head 58 engaged with the stem 53, and then the sleeve 62 is sealed at the front with the disc 69.

The housing 10 is provided with an internally threaded flange ring 67 for threadedly engaging the syringe bottle 5; and, the sleeve 62 is externally threaded to engage threads on the plunger 4 contained in the bottle 5.

The syringe bottle 5 may be of any desired constant cross-sectional volume. It may be of sufficient size to administer single injections, or it may be large enough to furnish a multiple of injections with suitable indicia markings on the bottle. One of the preferred forms of bottles is illustrated in the drawings as a cylindrical member 71 having the slidable plunger 4 positioned therein. The dimensions of the cylindrical member 71 and plunger 4 are such that a liquid seal exists between the two members when under elevated pressure sufficient to accomplish the desired result. The plunger 4 has an internally threaded hollow projection 72 adapted to engage the sleeve piston cylindrical member 62. One end of the bottle cylindrical member 71 is closed with a flanged disc 73 having an aperture 74 therein to permit the plunger projection 72 to extend therethrough. The flanged disc 73 is provided with external threads to engage the flanged ring 67 of the housing 10. Integrally secured to the flanged disc 73 are a plurality of bars 76 extending along the cylindrical member 71 and terminating in an externally threaded ring 77 secured thereto and surrounding the other end of the cylindrical member. Threadedly engaging the ring 77 is a flanged plate 78 having an externally threaded projection 79 provided with an aperture 80 extending through to plate 78. Secured to the projection 79 through a suitable coupling is a flexible tube 82 terminating in a four position stop cock 83 having a connection for attaching a flexible tube having a hypodermic needle (not shown) secured thereto.

There are several satisfactory methods of securing the bottle 5 to the housing 10 and the plunger 4 to the sleeve piston 3, but a most desirable and unique method has been provided which maintains sterile conditions throughout. The flanged disc 73 of the bottle 5 is provided with a recess 84 arranged to receive a stud 85 on plunger projection 72 to prevent free rotation of the plunger in the bottle. To prevent rotation of the sleeve piston 3 recesses 87 are provided in the sleeve, preferably on the annular projection 63 and constructed and arranged to receive a spring loaded plunger 88 provided in the housing 10. The plunger housing 89 is provided with a diametric slot 90 adapted to receive a pin 91 positioned on the plunger to permit the plunger 88 to be inserted into one of the recesses 87. When the plunger is retracted and rotated the pin 91 contacts the housing 89 holding the plunger 88 retracted. With the plunger 88 engaging a recess 87, the bottle flanged disc 73 is threadedly secured to the housing flanged ring 67 and the plunger projection 72 with the sleeve cylindrical member 62, simultaneously. Since the housing flange ring 67 supports the bottle it is desirable to have a longer threaded engagement of the ring and bottle than is necessary between the sleeve and plunger. Accordingly, the spring loaded plunger 88 holds the sleeve piston extended outwardly while the sleeve member 62 is engaged with the bottle plunger projection 72 and the flanged ring 67 is partially engaged with the flanged disc 73. The spring loaded plunger 88 is then retracted and the flanged ring 67 fully engaged with the flanged disc 73. When fully engaged the venting port 92 and arcuate slot 93 in the flanged disc 73 and flanged ring 67, respectively, align to permit free reciprocation of the plunger 4 in the bottle 5.

The bottle 5 and plunger 4 may be attached to the housing 10 and sleeve piston 3 with the bottle filled, or they may be attached with it empty. For the purpose of clarity and completeness of description, a cycle of operation will be described with a single injection bottle secured to the housing empty. The screw plug 14 is screwed into the housing 10 forcing the ampule 7 against the needle 11, which pierces the ampule permitting gas contained therein to escape through the needle conduit 12, Carborundum disc 15, conduit 17, pressure regulator 2 and conduit 25 to the pressure directing valve 28. With the four position stop cock 83 turned to connect the bottle 5 with the atmosphere (see Figure 16) the pressure directing valve 28 is turned to direct pressure through conduit 32 which is connected to the front compartment of the reciprocable sleeve piston 3, forcing the piston 3 outwardly and hence the plunger 4 to the bottom of the bottle forcing air therein out to the atmosphere. When the piston contacts the bottom of the bottle, back pressure shuts off the pressure at the pressure regulator. A tube is connected between the stop cock 83 and the physiological solution in a manner well known in the art. The stop cock 83 is turned to connect the solution and bottle 5 (see Figure 15), the directing valve 28 is rotated to direct pressure into conduit 33 connected with the rear compartment of the reciprocable sleeve piston 3, forcing the piston 3 inward and pulling the plunger 4 back in the bottle 5. As soon as the physiological solution enters the bottle, the stop cock 83 is turned to vent the bottle to the atmosphere and the directing valve turned to connect pressure with conduit 32 again; this expels all air in the system. The stop cock 83 and valve 28 are again turned to draw the physiological solution into the bottle, and when the bottle is filled the plunger 4 contacts the flanged disc 73 thereby creating back pressure to stop pressure at the pressure regulator. The tube that will lead to the patient is then attached to the stop cock 83, or to the projection 79 on the bottle 5, and the pressure directing valve 28 is turned to direct pressure through conduit 32. As soon as the solution emerges through the needle, the flexible tube is pinched to shut off the pressure at the regulator, the needle is inserted in the patient's vein, and the unit then permitted to continue in operation. The pressure regulator is adjusted according to the desired length of injection time, since the rate of flow is directly proportional to the pressure. The unit then may be strapped to the patient, litter, bed, or other structure, as further attention is not required.

The modification illustrated in Figures 24, 25 and 26, embraces the same principle as described above and substantially the same structure; the primary difference residing in the bottle construction and means for reciprocating the floating piston contained therein. In this modification, wherein the housing preferably is cast as a unit, the carbon dioxide capsule 7 is positioned in the well 8 and is surrounded by the Carborundum ring 15. The needle 11 having a conduit 12 therein is supported by the screw plug or cap 14. After puncturing the capsule 7 with the needle 11 the gas escapes through the conduit 12 therein to the upper part of the well 8, thence downward through the Carborundum ring 15 to the lower portion of the well 8, where it is connected with the pressure regulator 2.

The pressure regulator is a standard spring loaded diaphragm type comprising a diaphragm 100 having one side under tension of a spring 101 which tension is varied by a screw cap 102 and shaft lock nut 103. Opposed to the spring tension on the other side of the diaphragm is a lazy tong arrangement 104 actuating a needle valve 105. When the spring stress is greater the needle valve is open, and when the gas pressure is greater the needle valve is closed.

Connected with the pressure regulator 2 through any suitable means, such a port or conduit 108, as illustrated, is a syringe bottle 109 having a floating piston 110 therein. The floating piston 110 is actuated by an inflatable, and preferably extensible, member 112 secured in the bottle and having its open end in communication with the pressure conduit 108. This communication is effected through an annular conduit 113 registering with the conduit 108 and connected by a port 114 to the open end of the bottle 5, which end is closed by a screw cap pressure gauge 115. The other end of the bottle is provided with an attachment 116 for a flexible tube, not shown.

In order to fill the syringe bottle 109 after inflating the inflatable member and cutting off the pressure, means is provided for exhausting the inflatable member 112 whereby a physiological solution enters the bottle forcing the floating piston back in the bottle. The exhausting means includes an exhaust pump 117 having a valved inlet 118 connected by a conduit 119 with the pressure conduit 108, and a valved outlet 120 exhausting to the atmosphere. The manually operable valved piston 121 is provided with a screw cap 122 which may be engaged with the housing when not in use.

In order to assure smooth operation, spring-load relief valves 130 are provided between the portion of the bottle containing the inflatable member and the pressure entrance of the inflatable member.

In operation, this modification is similar to that discussed hereinabove, except that the filling of the bottle is accomplished by exhausting the inflatable member with the exhaust pump. The flow of solution when administering is automatic and the rate is controlled or regulated by setting the pressure of the pressure regulator.

The invention as described hereinabove may be modified in various ways without departing from the scope of the invention as defined in the appended claims.

Having thus described my invention, what I claim as new and wish to secure by Letters Patent is:

1. A positive feed intravenous injection device comprising a housing, a source of gas pressure mounted in said housing, pressure regulating means including a gas-permeable diaphragm adapted to pass predetermined amounts of gas from the source of gas pressure connected to said source of pressure, a piston slidably mounted in said housing and actuated by said pressure source, pressure directing means to selectively move said piston in a desired direction, and a syringe bottle having a plunger detachably connected to said piston.

2. A positive feed intravenous injection device comprising a frangible container of compressed gas mounted in the housing, a bottle mounted on the housing, a plunger slidably mounted in said bottle, means in the housing for breaking the frangible container of compressed gas, and pressure regulating means operably connecting said source of pressure with said slidable plunger.

3. A positive feed intravenous injection device comprising a housing, a source of pressure secured to said housing, pressure regulating means connected to said source of pressure, a cylinder provided in said housing, a stem extending within said cylinder, a conduit in said stem extending through the end of said stem, a second conduit in said stem extending into said cylinder, a stem head having an aperture communicating with the conduit extending through said stem, a slidable sleeve piston having one head surrounding said stem and a disc head mounted beyond said stem head, valve means selectively directing pressure to one of said conduits and venting the other conduit to move said sleeve piston in and out of said housing, a syringe bottle detachably connected to said housing, and a syringe plunger in said bottle detachably connected to said sleeve disc head.

4. A positive feed intravenous injection device comprising a source of pressure, a syringe bottle having a plunger therein, a slidable piston having two heads one of which is connected to said plunger, a stationary member positioned between said piston heads forming two compartments, and means selectively connecting one of said compartments with said pressure source and the other compartment with the atmosphere.

5. A positive feed intravenous injection device comprising a housing, a cylindrical bottle having a reciprocable plunger therein mounted on the housing, a source of regulated pressure contained in the housing and including a frangible container of compressed gas, a permeable diaphragm adapted to pass predetermined amounts of gas responsively to fracture of the said container, and means for fracturing the container, a member secured to said plunger and moved by said regulated pressure, and means selectively directing the gas passed through the diaphragm to move said member and plunger in a desired direction.

6. An intravenous injection device comprising a housing, a frangible ampule of compressed gas mounted in the housing, means in the housing adapted to engage the ampule to break the same, pressure directing means in the housing in communication with the ampule for receiving gas under pressure from the ampule when broken, a piston slidably mounted therein and adapted to be connected with the pressure directing means to selectively move said piston in a desired direction, and a syringe bottle having a plunger detachably connected to said piston.

7. An intravenous injection device comprising a housing, a bottle mounted on the housing, a plunger slidably mounted in said bottle, a container holding compressed gas mounted in the housing, means in the housing for breaking the container to release the gas therein, and means operably moving said slidable plunger responsively to release of gas from the container.

8. An intravenous injection device comprising a housing, a cylinder provided in said housing, a stem extending within said cylinder, a conduit in said stem extending through an end thereof, a second conduit in said stem extending into said cylinder, a stem head having an aperture communicating with the conduit extending through the end of said stem, a slidable sleeve piston having one head surrounding said stem and a disc head mounted beyond said stem head, valve means connected with a source of pressure and selectively directing pressure to one of said conduits and venting the other conduit to move said sleeve piston in and out of said housing, a syringe bottle detachably connected to said housing, and a syringe plunger in said bottle detachably connected to said sleeve disc head.

9. An intravenous injection device comprising a syringe bottle having a plunger therein, a slidable piston having two heads one of which is connected to said plunger, a stationary member positioned between said piston heads forming two hermetic compartments, and valve means selectively connecting a pressure source with one of said compartments and the other compartment with the atmosphere.

10. A positive feed intravenous injection device comprising a housing, a source of gas pressure mounted in said housing, pressure regulating means connected to said source of pressure, means in the housing for controllably releasing gas from the source of gas pressure to the pressure regulating means, a piston slidably mounted in said housing and actuated by said pressure source, pressure directing means in communication with the pressure regulating means to selectively move said piston in a desired direction, a syringe bottle secured to said housing, and a plunger slidably mounted in said bottle and detachably connected to said piston.

11. A positive feed intravenous injection device comprising a housing, a frangible container of compressed gas mounted in the housing, means mounted in the housing for breaking the container to release the gas under pressure therefrom, pressure controlling means in communication with the container for receiving the gas therefrom and passing the gas in controlled amounts, a bottle mounted on the housing, a plunger slidably mounted in said bottle, a double acting cylinder and piston assembly operably connected to the pressure controlling means and pressure directing means connecting said pressure controlling means with said double acting cylinder and piston assembly.

12. A positive feed intravenous injection device comprising a housing, a source of pressure secured to said housing, pressure regulating means connected to said source of pressure, a sleeve piston slidably mounted in said housing, a fixed piston positioned in said sleeve piston dividing the same into two expansible chambers, valve means selectively directing pressure to one of said chambers and venting the other chamber to move said sleeve piston in and out of said housing, a syringe bottle detachably connected to said housing, and a syringe plunger in said bottle detachably connected to said sleeve piston.

13. A positive feed intravenous injection device comprising a source of pressure, a syringe bottle, a plunger therein, a slidable sleeve piston connected to said plunger, a stationary member positioned between the ends of said sleeve piston forming two compartments, and valve means selectively connecting said pressure source with one of said compartments and the other compartment with the atmosphere.

14. A positive feed intravenous injection device comprising a housing, a frangible compressed carbon dioxide ampule contained in said housing, means mounted in the housing, said means being adapted to be brought into engagement with the ampule to break the same for releasing said carbon dioxide, pressure regulating means connected to the ampule adapted to pass therethrough predeterminedly controlled amounts of the released carbon dioxide, a piston slidably mounted in said housing and actuated by pressure produced by the released carbon dioxide, pressure directing means to selectively move said piston in a desired direction, and a syringe bottle mounted on the housing and having a plunger detachably connected to said piston.

15. A positive feed intravenous injection device comprising a housing, a source of gaseous pressure mounted in the housing, means mounted in the housing for releasing said gaseous pressure, a bottle mounted on the housing exteriorly thereof, a plunger slidably mounted in said bottle, and pressure regulating means connecting said source of gaseous pressure with said slidable plunger.

16. A positive feed intravenous injection device comprising a housing, a compressed gas ampule contained in said housing, means rupturing said ampule and releasing the gas therein to a conduit, pressure regulating means connected to said conduit, a cylinder provided in said housing, a stem extending within said cylinder, a conduit in said stem extending through an end of said stem, a second conduit in said stem extending into said cylinder, a stem head having an aperture communicating with the conduit extending through said stem, a slidable sleeve piston having one head surrounding said stem and a disc head mounted beyond said stem head, valve means selectively directing the regulated gas pressure to one of said conduits and venting the other conduit to move said sleeve piston in and out of said housing, a syringe bottle detachably connected to said housing, and a syringe plunger in said bottle detachably connected to said sleeve disc head.

17. A positive feed intravenous injection device comprising an ampule of compressed gas, means puncturing said ampule and releasing the gas therein into a conduit, a syringe bottle having a plunger therein, a slidable piston having two heads one of which is connected to said plunger, a stationary member positioned between said piston heads forming two compartments, and valve means selectively connecting said conduit with one of said compartments and the other compartment with the atmosphere.

18. A positive feed intravenous injection device comprising a housing, a cylindrical bottle having a reciprocable plunger therein, the bottle being mounted on the housing exteriorly thereof, an ampule of compressed gas mounted in the housing, means in the housing for breaking the ampule upon exertion of breaking pressure thereon for releasing said gas to a conduit provided in the housing, a member of known gas pressure porosity positioned in said conduit, a member secured to said plunger and moved by said gas pressure, and means selectively directing said gas pressure to move said member and plunger in a desired direction.

HARRY ROBERT GRAU.

REFERENCES CITED

The following references are of record in the file of this patent:

UNITED STATES PATENTS

| Number | Name | Date |
| --- | --- | --- |
| 2,008,363 | Maris | July 16, 1935 |
| 2,101,140 | Hege | Dec. 7, 1937 |
| 2,105,946 | Lewis | Jan. 18, 1938 |
| 2,184,152 | Saffir | Dec. 19, 1939 |
| 2,390,246 | Folkman | Dec. 4, 1945 |

FOREIGN PATENTS

| Number | Country | Date |
| --- | --- | --- |
| 299,403 | Germany | July 11, 1917 |